United States Patent
Costello et al.

(10) Patent No.: US 8,934,618 B2
(45) Date of Patent: Jan. 13, 2015

(54) METHOD FOR ANALYSING AN INTERACTIVE VOICE RESPONSE SYSTEM

(75) Inventors: John Costello, Claregalway (IE); Tony McCormack, Galway (IE); John Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 1400 days.

(21) Appl. No.: 12/345,200

(22) Filed: Dec. 29, 2008

(65) Prior Publication Data

US 2010/0166158 A1 Jul. 1, 2010

(51) Int. Cl.
| H04M 5/00 | (2006.01) |
| G10L 15/22 | (2006.01) |
| H04M 3/493 | (2006.01) |
| H04M 3/51 | (2006.01) |
| H04M 3/42 | (2006.01) |

(52) U.S. Cl.
CPC .............. *G10L 15/22* (2013.01); *H04M 3/493* (2013.01); *H04M 3/5166* (2013.01); *H04M 2201/38* (2013.01); *H04M 2203/355* (2013.01)
USPC .................................. 379/265.12; 455/414.1

(58) Field of Classification Search
CPC .......................... G06Q 10/087; G06Q 30/0601
USPC .......................................... 379/265.01–266.1
See application file for complete search history.

(56) References Cited

U.S. PATENT DOCUMENTS

| 6,539,359 | B1 * | 3/2003 | Ladd et al. .................... 704/275 |
| 6,922,466 | B1 * | 7/2005 | Peterson et al. ........... 379/88.09 |
| 7,142,661 | B2 * | 11/2006 | Erhart et al. ............. 379/265.09 |
| 2001/0049688 | A1 * | 12/2001 | Fratkina et al. ............ 707/104.1 |
| 2002/0064149 | A1 * | 5/2002 | Elliott et al. .................. 370/352 |
| 2007/0071220 | A1 * | 3/2007 | Weldon et al. ................ 379/235 |
| 2007/0198272 | A1 * | 8/2007 | Horioka et al. ............... 704/275 |
| 2007/0276691 | A1 * | 11/2007 | Grant ................................ 705/1 |
| 2009/0149158 | A1 * | 6/2009 | Goldfarb et al. ........... 455/414.1 |
| 2010/0132020 | A1 * | 5/2010 | Paul .................................. 726/7 |
| 2010/0272246 | A1 * | 10/2010 | Malik et al. ................ 379/88.18 |

* cited by examiner

*Primary Examiner* — Fan Tsang
*Assistant Examiner* — Solomon Bezuayehu
(74) *Attorney, Agent, or Firm* — Barnes & Thornburg LLP

(57) ABSTRACT

Methods for analyzing an interactive voice response (IVR) system are disclosed. In the methods, prompts are issued from the IVR system and user input made in response to the prompts from the IVR system is received. One method involves displaying the prompts issued by the IVR system to an operator; and receiving input data from the operator, the data defining whether any change to the IVR system is recommended and/or any recommended changes to the IVR system. Another method involves detecting the occurrence of an unexpected event by comparing the user input against a predefined set of rules, each rule being associated with one or more of the unexpected events; and taking a predefined action in response to the detection of one or more of the unexpected events.

21 Claims, 4 Drawing Sheets

METHOD FOR ANALYSING AN INTERACTIVE VOICE RESPONSE SYSTEM

FIELD OF THE INVENTION

This invention relates to a method for analysing an interactive voice response (IVR) system, and to an IVR system on which the method can be performed.

BACKGROUND OF THE INVENTION

IVR systems are well known, particularly for the automated handling of telephone calls by large corporations. Often such systems are used to handle simple queries (for example, to tell a customer the balance of his account or to book cinema tickets) or to handle initial call filtering to ensure that a customer is transferred to an operator or agent with the knowledge and skills required to handle a particular type of query.

A typical IVR system comprises a set of options which are presented to a user in spoken form. The set of options is often defined using a suitable programming language such as VoiceXML. A VoiceXML file can be parsed by a voice browser, which plays the sound associated with each option when it is invoked. The VoiceXML also defines the hierarchy of options so that the voice browser knows which sound it is appropriate to play to the user. The sounds that are played to the user may simply be pre-recorded audio files (for example, MP3 files) or they may be generated by text-to-speech (TTS) software.

Speech recognition software analyses the responses made by the user to the sounds played by the IVR system and takes appropriate action. This action may be to transfer the user to the correct operator or agent or to cause another sound or set of sounds to be played to the user (for example, if the user has entered a sub-menu).

Whilst IVR systems are clearly very useful for handling large volumes of simple queries in a timely and cost-effective manner and for handling routing of calls to the appropriate agent, they are notorious for frustrating users. Often users find themselves in the wrong queue and then end up being connected to the wrong agent. Alternatively, users may become so frustrated that they simply hang up.

These problems generally stem from poor design of the menu system used by the IVR, which may be difficult for a user to understand or be ambiguous or simply too long-winded for a user to listen attentively to.

Prior solutions have involved using after-call surveys or scorecards to gather the user's opinion on the IVR system, but users are generally reluctant to participate and are not often reliable in the answers they provide. Other options include listening to call recordings to determine whether any problems with the IVR menu options exist and what such problems are, but this is a very labour-intensive and hence expensive process.

SUMMARY OF THE INVENTION

In accordance with one aspect of the invention, there is provided a method for analysing an interactive voice response (IVR) system, the method comprising issuing at least one prompt from the IVR system; receiving user input made in response to the or each prompt from the IVR system; displaying the or each prompt issued by the IVR system to an operator; and receiving input data from the operator, the data defining whether any change to the IVR system is recommended and/or any recommended changes to the IVR system.

By displaying the prompts issued by the IVR system to the operator it is easy for the operator to see the nature of the interaction between the IVR system and the user and hence to determine where any problems may have occurred. This knowledge is key to the suitable reconfiguration of the system to eliminate such problems.

The display of the prompts may be made either during or at the end of the call or in response to a request made by the operator (for example, if the user explained to the operator during conversation that a problem occurred with the IVR).

By analysing the problems as they occur it is possible to refine the system in an expedient manner, thereby reducing the level of any future problems.

The or each prompt issued by the IVR system is typically a spoken prompt. It may be generated by playing a pre-recorded sound file to the user or by text-to-speech software.

The user input is preferably received by a speech recognition system adapted to convert spoken user input into a form understandable by the IVR system. For example, the speech recognition system may convert the detected speech input from the user into text data.

However, in other embodiments the user input may be received in the form of dual-tone multi-frequency (DTMF) signalling. In this case, the prompts will typically request a user to press one of the buttons on their telephone keypad to select an associated option. If a user presses a button on their keypad a DTMF signal is generated which can be detected by the IVR system and decoded by a DTMF decoder. The output from the DTMF decoder indicates to the IVR system which button the user has pressed on their keypad, and hence which option has been selected.

Typically, the or each prompt forms part of a set of predefined prompts, which collectively define a menu of options for selection by a user. The set of predefined prompts typically includes one or more sub-menus.

In a preferred embodiment, the step of displaying the or each prompt issued by the IVR system to the operator comprises displaying a visual representation of the menu of options and highlighting the options selected by the user. This visual representation may be a textual representation or, preferably, a graphical representation in which the highlighting is performed by displaying the options selected by the user in a brighter colour than the unselected options. This makes the path chosen by the user through the menu system particularly apparent to the operator.

Preferably, the step of receiving input data from the operator comprises receiving user input defining alterations to the menu of options. These alterations represent the recommended changes to the IVR system and they may be implemented immediately by the IVR system or after review and approval by a supervisor.

Typically, the step of displaying the or each prompt issued by the IVR system to the operator comprises displaying a visual representation of the user input made in response to the or each prompt from the IVR system. This is particularly helpful in analysing the nature of any problems as it indicates quite how the user encountered a problem and why. For example, the problem may be a unique problem caused by a user making an irrational or deliberately unhelpful response to a prompt. In such a case, the operator may choose not to recommend any changes.

In accordance with a second aspect of the invention, there is provided a method for analysing an interactive voice response (IVR) system, the method comprising issuing at least one prompt from the IVR system; receiving user input made in response to the or each prompt from the IVR system; detecting the occurrence of an unexpected event by comparing the user input against a predefined set of rules, each rule being associated with one or more of the unexpected events; and taking a predefined action in response to the detection of one or more of the unexpected events.

This aspect of the invention represents an alternative solution to that presented by the first aspect. It overcomes the problems with existing IVR systems by detecting when unexpected or undesired events have occurred (for example, a user ending up in the wrong sub-menu on an IVR system) by comparing the user input against a predefined set of rules. These rules are constructed to detect when problems occur and have an action associated with them that can be taken. The action may help to ameliorate the situation.

The or each prompt issued by the IVR system is typically a spoken prompt. It may be generated by playing a pre-recorded sound file to the user or by text-to-speech software.

The user input is preferably received by a speech recognition system adapted to convert spoken user input into a form understandable by the IVR system. For example, the speech recognition system may convert the detected speech input form the user into text data.

However, in other embodiments the user input may be received in the form of dual-tone multi-frequency (DTMF) signalling. In this case, the prompts will typically request a user to press one of the buttons on their telephone keypad to select an associated option. If a user presses a button on their keypad a DTMF signal is generated which can be detected by the IVR system and decoded by a DTMF decoder. The output from the DTMF decoder indicates to the IVR system which button the user has pressed on their keypad, and hence which option has been selected.

Typically, the or each prompt forms part of a set of predefined prompts, which collectively define a menu of options for selection by a user. The set of predefined prompts typically includes one or more sub-menus.

In one embodiment, the set of rules includes one or more rules which analyse whether the received user input is related to a sub-menu other than the current sub-menu. In this case, the predefined action can advantageously be to cause the IVR system to issue the set of predefined prompts which includes the sub-menu related to the received user input. Thus a user that has ended up in an undesired sub-menu can be redirected to the desired sub-menu if he makes an input associated with the desired sub-menu.

The set of rules may include one or more rules which analyse whether the received user input is recognisable by the IVR system. If it is not then the user may be routed to an agent to handle the query, for example.

The set of rules may include one or more rules which analyse whether a particular prompt has been issued already to the user and/or whether user input has already been received from the user in response to an issued prompt. Thus, if the user ends up in a loop between sub-menus this can be detected and appropriate remedial action taken.

The predefined action may be to cause the IVR system to redirect the user to an operator for assistance.

The predefined action may be to store the prompts issued by the IVR system and the user input received in response to the prompts for analysis by an operator. This allows an operator to analyse any problems that may have occurred and which the IVR system cannot handle automatically so that appropriate action (for example, redesigning the IVR menus) can be taken.

In a third aspect of the invention, an IVR system comprises a processor adapted to perform the method of any of the preceding claims.

In a fourth aspect of the invention, a computer program comprises a set of instructions for performing the method of the first aspect when executed on a processor.

In a fifth aspect of the invention, a computer-readable medium upon which a computer program comprises a set of instructions is stored for performing the method of the first aspect when the computer program is executed on a processor.

Other aspects and features of the present invention will become apparent to those of ordinary skill in the art upon review of the following description of specific embodiments of the invention in conjunction with the accompanying drawings.

DESCRIPTION OF THE EMBODIMENTS

Embodiments of the invention will now be described with reference to the accompanying drawings, in which.

Figure 1:
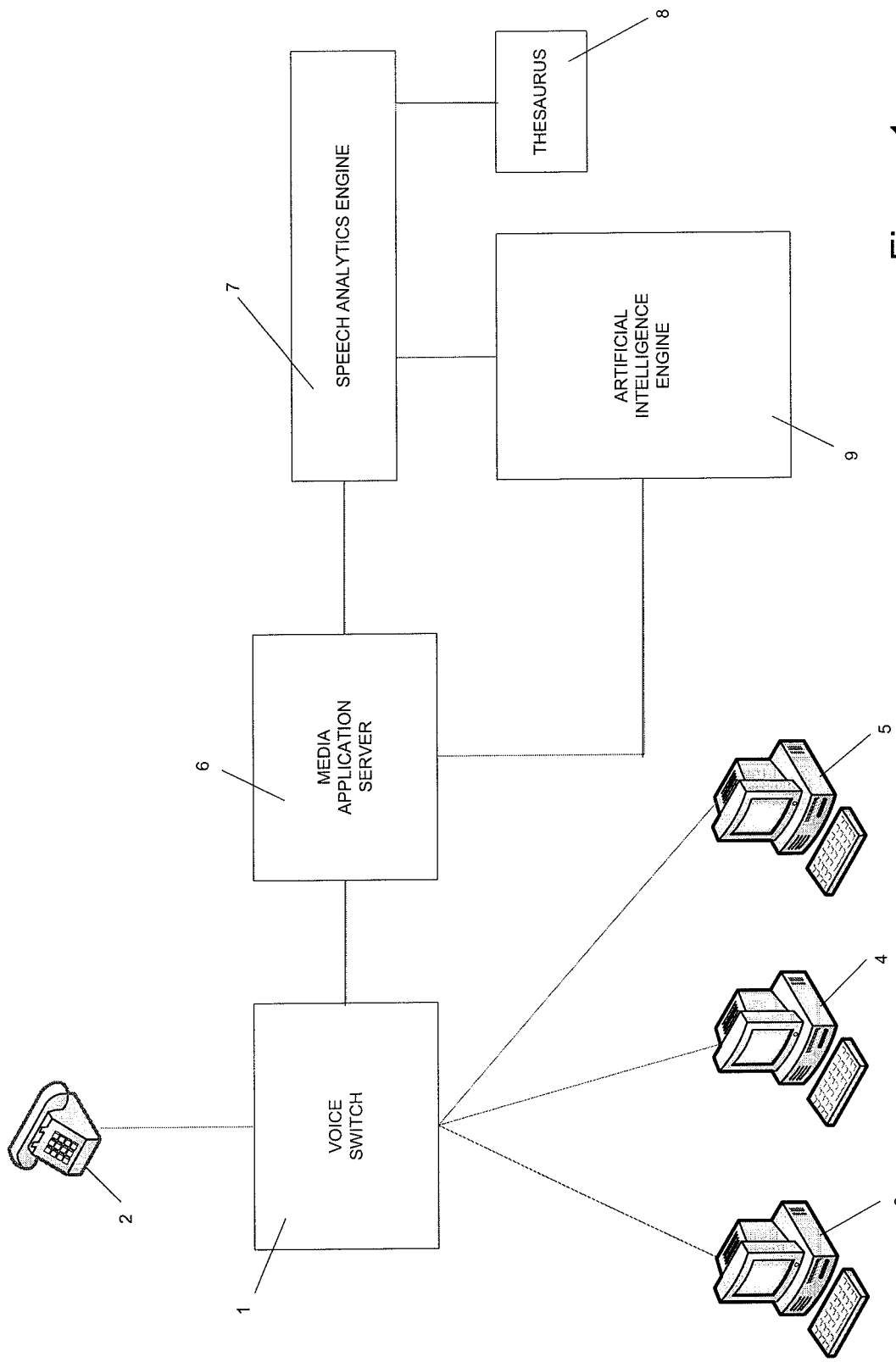
FIG. 1 shows an IVR system on which the method may be performed.

FIG. 1 shows an IVR system on which the method of the invention may be performed. The IVR system comprises a voice switch 1 which is used for routing incoming voice calls (for example, from a customer's telephone 2). Voice switch 1 may use any conventional call routing technology to transport the voice traffic, for example it may be a circuit switched system or a Voice over Internet Protocol (VoIP) system. The voice switch can route an incoming call to any one of the call centre agents 3, 4 or 5. However, new calls are firstly routed to a media application server 6 by voice switch 1.

The media application server 6 forms the core of the IVR system and runs voice browser software, which parses a VoiceXML file and issues spoken prompts or requests to a caller. As already explained, the VoiceXML player may either configure the voice browser to replay pre-recorded files which contain the spoken prompts or request, or alternatively may pass character data from the tags in the VoiceXML file to text-to-speech converter software that generates the spoken prompts or requests on the fly.

The media application server 6 can issue a command to voice switch 1 to cause it to route a call onwards, if appropriate, to one of the call centre agents 3, 4 or 5. This may be done because the caller has selected an option that requires the call to be routed to one of the agents 3, 4 or 5 or because the IVR system cannot understand a response and defaults to routing the call to one of the agents 3, 4 or 5.

Voice responses made by the caller from telephone 1 are captured by a speech analytics engine 7 connected to the media application server 6. This comprises speech recognition software that converts the words spoken by the caller into machine-readable input (for example, character data).

Although the embodiments described herein refer exclusively to the use of a speech recognition system (i.e. speech analytics engine 7), it is possible to construct a system which comprises a DTMF decoder for detecting DTMF signalling responses made by the user either instead of or in addition to the speech analytics engine 7.

The speech analytics engine 7 may refer to a thesaurus 8 which comprises a list of predefine synonyms for certain words. For example, if a caller is asked to choose from a list of options, one of which is "Customer Support" and they respond with "Repairs" (perhaps because they did not hear the options correctly and merely respond with an option they would prefer) then the speech analytics engine 7 may refer to the thesaurus 8 to see if there are any synonyms for "Repairs". If the thesaurus is configured appropriately then it can indicate that "Repairs" is a synonym for "Customer Support", and the appropriate action can be taken in response to the previously unrecognisable user input.

In addition, the speech analytics engine 7 may comprise software that can analyse the speech of the caller and identify the topic that they are talking about, their emotional state and the ratio of silence to speech. These items may form part of the machine-readable input derived from the captured speech by the speech analytics engine 7.

The speech analytics engine 7 provides the machine-readable input to the voice browser to influence the flow of parsing of the VoiceXML file. For example, if "Customer Support" is selected then the voice browser executing on media application server 6 can be instructed to follow an associated link to the correct portion of the VoiceXML file for handling issues related to customer support.

The speech analytics engine 7 also provides the machine-readable input to an artificial intelligence engine 9, which compares the machine-readable input against a set of rules and if a match occurs takes a predefined action associated with the rules. Examples of the rules and predefined actions will be provided later.

An example application will now be described with reference to FIG. 2 and the flow charts of FIGS. 3 and 4.

Figure 2:
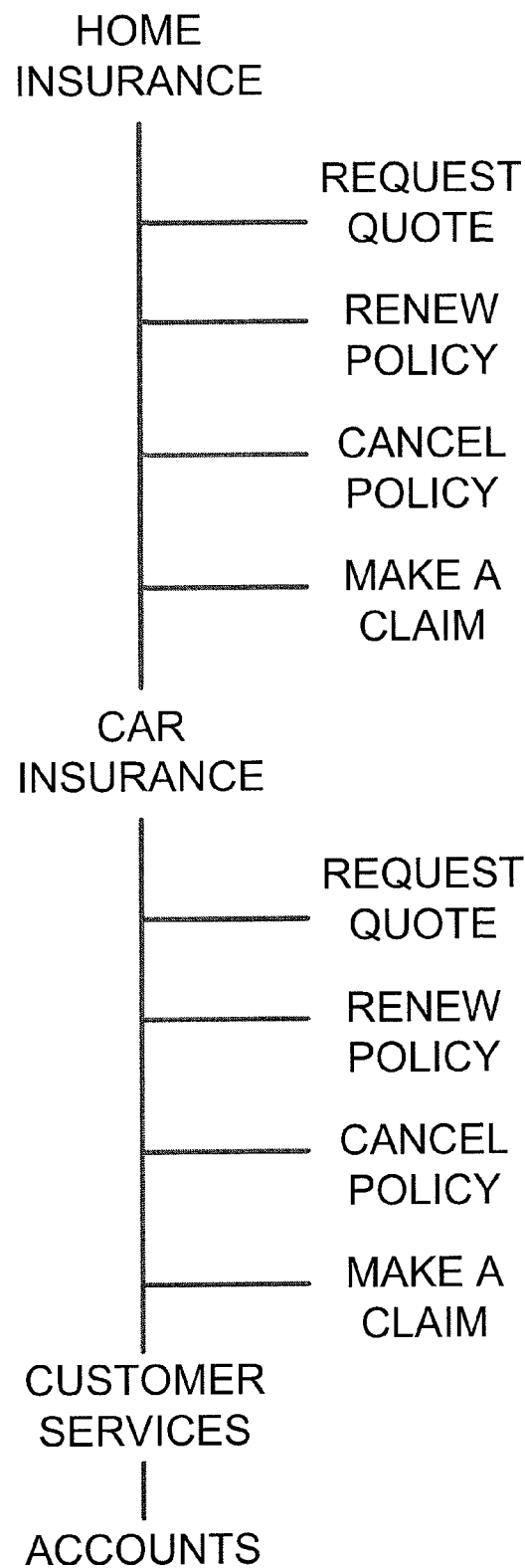
FIG. 2 shows an example menu structure for the IVR system.

FIG. 2 shows an example of a menu structure for use in an IVR system employed by an insurance company. The menu structure comprises a top-level menu with four options "Home Insurance", "Car Insurance", "Customer Services" and "Accounts". Under each of the "Home Insurance" and "Car Insurance" options is a respective sub-menu, each having the options "Request Quote", "Renew Policy", "Cancel Policy" or "Make a Claim".

The menu structure can be implemented by creating a suitable VoiceXML file. The VoiceXML file will cause the voice browser software running in media application server 6, on answering their call, to play an introductory welcome message and then to ask the caller whether their call relates to a query to do with Home Insurance or Car Insurance or whether they would like to be transferred to the Customer Services or Accounts departments. The voice browser will then wait for further input.

When the caller responds the speech analytics engine 7 will determine the nature of their response and provide the further input to the voice browser, causing it to parse the portion of the VoiceXML file related to the caller's response. For example, if the caller responds that their query relates to car or home insurance then the voice browser will parse the portion of the VoiceXML file that relates to the appropriate sub-menu for either Home Insurance or Car Insurance. The voice browser will then issue the prompts associated with the sub-menu, i.e. it will ask the caller whether they would like a quote for insurance, wish to renew their policy, wish to cancel their policy or to make a claim. Again, it will await further input.

When the caller responds the speech analytics engine 7 will determine the nature of the caller's response and provide the further input to the voice browser. The call will then be transferred to one of the agents 3, 4 or 5 with the appropriate skills to deal with the caller's query.

Figure 3:
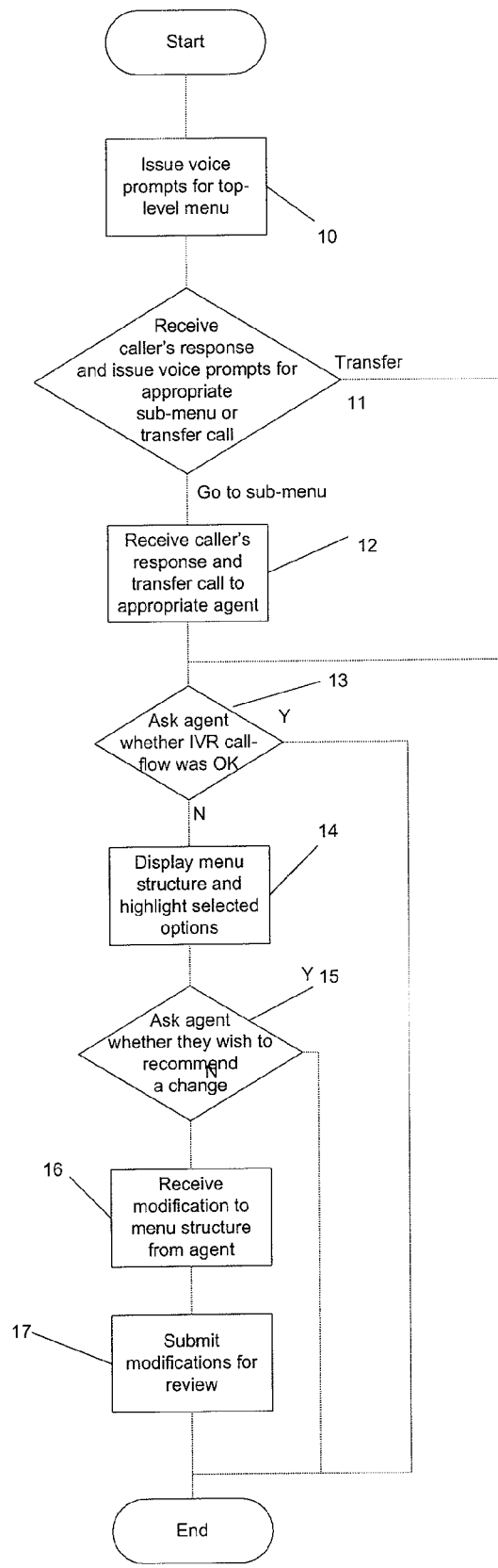
FIGS. 3 and 4 show flow charts of the steps performed by the methods of the invention.

FIG. 3 shows a flow chart which explains how a first embodiment of the invention works in practice with reference to the menu structure of FIG. 2. In step 10, the voice browser, having answered a call, issues the welcome message and the voice prompts for the top-level menu, i.e. it asks the caller whether the call is to do with home insurance or car insurance or whether they wish to be transferred to either of the customer services or accounts departments.

In step 11, the voice browser software running on media application server 6 awaits input from the speech analytics engine 7. The speech analytics engine 7 analyses the voice response from the user and provides machine-readable input to the voice browser software. If the caller has responded that their query is to do with car insurance or home insurance then the voice browser will parse the appropriate section of the VoiceXML file, causing it to issue the voice prompts for the appropriate sub-menu, i.e. for either the car insurance or home insurance sub-menu.

On the other hand, if the speech analytics engine 7 determines that the caller wishes to be transferred to the customer services or accounts department then the voice browser will parse the appropriate portion of the VoiceXML file which will cause the voice switch 1 to transfer the call to an agent 3, 4 or 5 in the customer services or accounts department.

If the voice browser issued the voice prompts in step 11 for either the car or home insurance sub-menus then in step 12 it waits for a response from the caller and then transfers the call to the appropriate agent 3, 4 or 5 to handle the query.

In step 13, the agent 3, 4 or 5 is asked whether he believes the customer's experience with the IVR system was acceptable. If he answers "Yes" then no further action is taken. However, if he answers "No" then in step 14, the menu structure of FIG. 2 is displayed to the agent 3, 4 or 5 and the route through the menu structure chosen by the caller highlighted (for example, by displaying it in a different or brighter colour).

In addition to highlighting the route through the menu structure that the caller has chosen, the voice responses made by the caller can also be replayed to the agent (or if DTMF input is received, the keypad button pressed by the caller can be displayed), for example, by clicking on the appropriate highlighted menu options. This helps the agent to see whether the user's response was appropriate to the circumstances or not. Furthermore, the machine-readable input generated by the speech analytics engine 7 can be displayed to the agent so that any possible problems with analysing the caller's voice can be picked up.

One example of a problem that could occur in the example of FIG. 2 is when a customer with a home insurance policy who wishes to check that their payment has been received responds that their query relates to home insurance before listening to all the options in the top-level menu. Thus, they will not realise that they should have requested to be transferred to the accounts department. However, once they have selected the sub-menu for home insurance there is no appropriate option for them to select. They are therefore likely to simply select a random one of the four inappropriate options and will be transferred to the wrong agent. The agent will quickly realise that a problem has occurred and can answer "Yes" in response to the question posed in step 14.

A second possible problem is that a caller may not realise that to ask a general query related a car insurance policy he need to select the Customer Services option from the top-level menu and instead selects the car insurance option. However, there is no option for asking a general query under the car insurance sub-menu. Again, the caller is likely to select a random one of the four inappropriate options and will be transferred to the wrong agent.

In step 15, the agent 3, 4 or 5 is asked whether they wish to recommend a change to the menu structure having analysed the route chosen and the voice responses made by the user (and possibly the machine-readable input). If they do not then no further action is taken.

However, if they do wish to make a change then step 16 captures the details of the changes. These may be made in a graphical environment by dragging and dropping the elements of the existing menu, deleting undesired elements and adding any new elements required. The modified menu structure can then be submitted for review in step 17.

For example, one modification that would obviate both of the abovementioned problems is to move the replicated elements in each sub-menu (i.e. "Request Quote", "Renew Policy", Cancel Policy", and "Make a Claim") into the top-level menu along with the "Customer Services" and "Accounts" options. Each of the "Request Quote", "Renew Policy", Cancel Policy", and "Make a Claim" options could then have a sub-menu where the caller can select either "Car Insurance" or "Home Insurance". This modification will prevent the caller pre-emptively selecting "Car Insurance" or "Home Insurance" as in the first problem and should prevent the caller from ending up in the sub-menu without an appropriate option to select as in the second problem.

Figure 4:
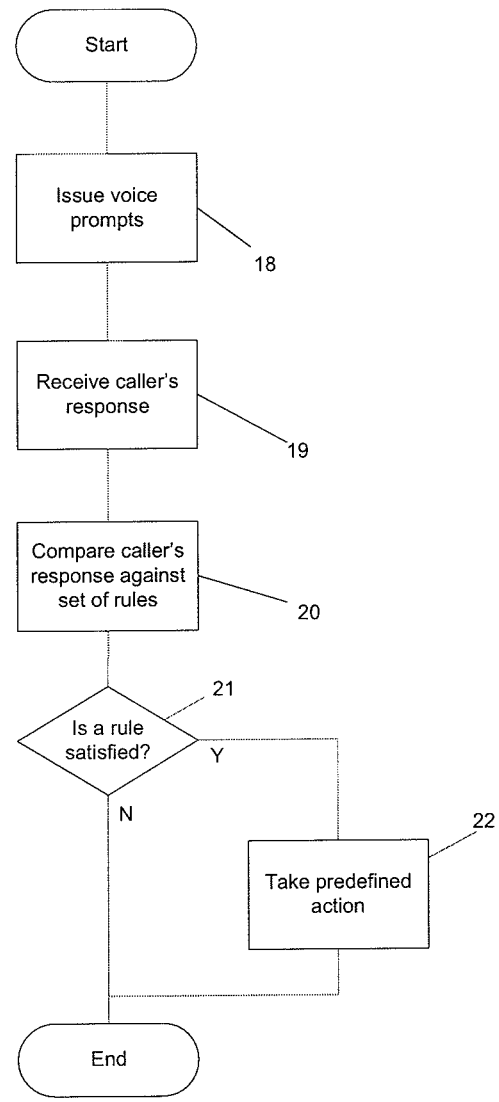

FIG. 4 shows a flow chart for another embodiment of the invention for automatic detection of problems occurring with the usage of the IVR system. The embodiment of FIG. 4 may be used alone or in combination with the FIG. 3 embodiment.

The FIG. 4 embodiment deals with the processing performed by the artificial intelligence engine 9 shown in FIG. 1. Steps 18 and 19 illustrate the issue of a voice prompt and a response received from a caller.

In step 20, the artificial intelligence engine 9 compares the machine-readable input generated by the speech analytics engine 7 with a set of predefined rules. Step 21 determines whether any of the rules is satisfied. If not then no further action is performed. However, if one of the rules is satisfied then a predefined action associated with that rule is taken in step 22.

The artificial intelligence engine 9 comprises a set of rules, each of which has an associated predefined action. The rules are written to detect the occurrence of an unexpected or undesired event and the predefined actions attempt to ameliorate the occurrence of the event if possible. The rules may also have a priority order, either by including them in the rule set in the order in which they should be processed and always dealing only with the first rule which is satisfied or by associating a priority field with each rule, the priority field indicating the relative priority of the rule.

Clearly, a large variety of rules may be created and these will need to be made to suit a particular situation. However, some examples of rules and associated predefined actions that may be found in typical situations follow.

In a first example, a rule is defined which detects whether the caller has spoken an unrecognised word. The artificial intelligence engine 7 can look in the thesaurus to see if the unrecognised word is a synonym for a recognised word. If the word is not recognisable then the predefined action can be to route the call to an agent 3, 4 or 5. This will be done by issuing a suitable command to the media application server 6 to cause it to request the voice switch 1 to reroute the call to the agent 3, 4 or 5.

A modification to this rule deals with the situation where a user has become annoyed with the IVR system to the extent that they are swearing. The modified rule can detect whether the caller has spoken any one of a number of profane words, and if so transfer the call to an agent.

As already mentioned, the speech analytics engine 7 may also be configured to detect the ratio of silence to speech and/or the emotional state of the caller. A rule may therefore be defined that causes the call to be routed to an agent if the caller is silent for an extended period of time (perhaps indicating they are confused by the IVR menu options) or if they are detected to have become irate.

It should be realised that whilst the flow charts of FIGS. 3 and 4 show the receipt of voice input from a caller coming after the issue of voice prompts from the IVR system, it is possible that the caller could start to respond before the voice prompt has completely finished. This pre-emptive response will be monitored and processed by the IVR system as though it had come at the expected stage after the voice prompt has completely finished.

In a second example, a rule can be defined to simply make a record of the call (including details of the voice prompts and responses by the caller) and flag the record for analysis (for example, by e-mailing it to an operator) if a caller appears to become irate or swears at the IVR system. This might be useful in circumstances where a recorded message (for example, indicating that the office called is now closed) is played after a protracted period of navigating through an IVR menu. By monitoring the records of such calls, an operator can quickly determine that the message should be played at the start of the IVR interaction rather than just before a caller believes that he is about to be transferred to an agent after a prolonged period navigating through the IVR menus.

In a third example, a rule can be defined which looks for words that are not expected in the context of a list of options associated with the voice prompts given, but which are understood in a different context. For example, in the case of the FIG. 2 example a user may have chosen the home insurance option in the top-level menu because they have a home insurance policy about which they have a general query. There is no option for general queries in the sub-menu for home insurance in the menu structure of FIG. 2, leaving the caller with no apparent options. However, the rule can be configured to detect words such as "Customer Services" or "General Query" and take action by routing the call to an appropriate agent, in this case a customer services agent. A record of the call may also be made as in the second example. This allows the operator to get a good idea of the frequency of such occurrences so that they can consider whether a redesign to avoid such a problem is worthwhile. Before routing the caller to the appropriate agent, the IVR system could be configured to issue a voice prompt to check that this is what the caller desires.

In a fourth example, a rule can be defined to detect when the caller has simply ended up at the end of the IVR menu. For example, in the FIG. 2 menu structure, a caller could end with no options left after having selected either of the Car Insurance or Home Insurance options when they wanted to make a general query or accounts query on either type of insurance policy because the options for these are in the top-level menu. This type of problem can be detected by a prolonged silence or an irate outburst from the caller or alternatively if they choose a random one of the available options and then have to be transferred to the appropriate agent for their query. A record of the call may also be made as in the second and third examples.

In a fifth example, a rule can be defined to analyse whether a particular prompt has been issued already to the caller and/or whether the caller's input has already been received in response to an issued prompt. This is useful for detecting if the caller is jumping backwards and forwards between different sub-menus, which could occur in more complicated IVR menu structures. The predefined action would typically be to route the call to an agent to intervene and/or to make a record of the call as in the second to fourth examples.

The embodiments described herein set out ways in which problems with the design of an IVR system can be detected (either by manual means or automatically). In some instances, automatic intervention is possible whilst in other instance manual redesign of the IVR system will be determined to be appropriate without expending large amounts of labour.

The invention claimed is:

1. A method for analysing an interactive voice response (IVR) system, the method comprising:
   issuing at least one prompt from the IVR system;
   receiving user input made in response to each issued prompt;
   displaying each issued prompt to an operator; and
   receiving input data from the operator based on each displayed prompt, the data defining at least one of (a) whether any redesign of the IVR system is recommended, and (b) a recommended redesign of the IVR system.

2. A method according to claim 1, wherein each issued prompt is a spoken prompt.

3. A method according to claim 1, wherein the user input is received by a speech recognition system adapted to convert spoken user input into a form understandable by the IVR system.

4. A method according to claim 1, wherein each issued prompt forms part of a set of predefined prompts, which collectively define a menu of options for selection by a user.

5. A method according to claim 4, wherein the set of predefined prompts includes one or more sub-menus.

6. A method according to claim 4, wherein the step of displaying each issued prompt to the operator comprises displaying a visual representation of the menu of options and highlighting the options selected by the user.

7. A method according to claim 4, wherein the step of receiving input data from the operator comprises receiving user input defining alterations to the menu of options.

8. A method according to claim 1, wherein the step of displaying each issued prompt issued by the IVR system to the operator comprises displaying a visual representation of the user input made in response to each prompt from the IVR system.

9. A method for analysing an interactive voice response (IVR) system, the method comprising;
   issuing at least one prompt from the IVR system;
   receiving user input made in response to each issued prompt;
   displaying each issued prompt to an operator;
   receiving input data from the operator based on each displayed prompt, the data defining at least one of (a) whether redesign of the IVR system is recommended, and (b) a recommended redesign of the IVR system;
   wherein the system is further capable of:
   automatically detecting the occurrence of an unexpected event by comparing the user input against a predefined set of rules, each rule being associated with one or more of the unexpected events;
   automatically taking a predefined action in response to the detection of one or more of the unexpected events; and
   wherein each issued prompt forms part of a set of prompts, which collectively define a menu of options for selection by a user.

10. A method according to claim 9, wherein each issued prompt is a spoken prompt.

11. A method according to claim 9, wherein the user input is received by a speech recognition system adapted to convert spoken user input into a form understandable by the IVR system.

12. A method according to claim 9, wherein the set of predefined prompts includes one or more sub-menus.

13. A method according to claim 12, wherein the set of rules includes one or more rules which analyse whether the received user input is related to a sub-menu other than the a current sub-menu.

14. A method according to claim 13, wherein the predefined action is to cause the IVR system to issue the prompts forming the sub-menu related to the received user input.

15. A method according to claim 9, wherein the set of rules includes one or more rules which analyse whether the received user input is recognisable by the IVR system.

16. A method according to claim 9, wherein the set of rules includes one or more rules which analyse whether a particular prompt has been issued already to the user and/or whether user input has already been received from the user in response to an issued prompt.

17. A method according to claim 9, wherein the predefined action is to cause the IVR system to redirect the user to an operator for assistance.

18. A method according to claim 9, wherein the predefined action is to store the prompts issued by the IVR system and the user input received in response to the prompts for analysis by an operator.

19. An IVR system comprising a processor adapted to perform the method of claim 1.

20. A non-transitory computer-readable medium upon which a computer program comprising a set of instructions is stored for performing the method of claim 1 where the computer program is executed on a processor.

21. A method according to claim 16, wherein the set of predefined prompts includes one or more sub-menus and the set of rules includes one or more rules which analyze whether the user is in a loop between sub-menus.

* * * * *